United States Patent [19]

Janning

[11] 4,047,110
[45] Sept. 6, 1977

[54] TRANSMITTER COUPLED ACTIVE FILTER

[75] Inventor: Eugene A. Janning, West Chester, Ohio

[73] Assignee: Xetron Corporation, Cincinnati, Ohio

[21] Appl. No.: 701,540

[22] Filed: July 1, 1976

[51] Int. Cl.² ............................................. H04B 1/04
[52] U.S. Cl. .................................. 325/123; 325/159; 325/177
[58] Field of Search ....................... 325/1, 7, 9, 10, 17, 325/25, 101, 144, 159, 171, 172, 174, 177, 181, 187, 123, 133, 134, 65

[56] References Cited

U.S. PATENT DOCUMENTS

| | | | |
|---|---|---|---|
| 2,891,157 | 6/1959 | Hansel | 325/134 |
| 3,390,337 | 6/1968 | Beitman, Jr. | 325/174 |
| 3,509,500 | 4/1970 | McNair et al. | 325/174 |

Primary Examiner—Robert L. Griffin
Assistant Examiner—Marc E. Bookbinder
Attorney, Agent, or Firm—Irwin P. Garfinkle

[57] ABSTRACT

The high power (10–1000 W) modulated carrier of a noisy transmitter is attenuated and amplitude limited and is used to control a power oscillator which regenerates the carrier and modulations without the loss of power. The power oscillator is slaved in frequency to the amplitude limited and attenuated signal, and it follows any phase or frequency modulation present thereon. Noise components appearing on the original carrier fall outside of the information passband of the power oscillator loop and therefore are not reproduced. The noise free output from the power oscillator is then A.M. modulated prior to power amplification and transmission. The oscillator operates at relatively high power (1 watt) and is automatically digitally coarse tuned and analog fine tuned.

21 Claims, 4 Drawing Figures

TRANSMITTER COUPLED ACTIVE FILTER

BACKGROUND OF THE INVENTION

Much of the radio transmitting and receiving equipments in operation today use broadband circuitry which reduces the number of components, particularly the more expensive ones, and is simpler, lighter, smaller, less expensive and particularly attractive for use on aircraft. However, by its very nature a broadband transmitter generates unwanted in-band radiation from its power amplifiers. This does not generally create a serious problem except when the transmitter is located near a co-located receiver. Since many modern aircraft now carry a number of broadband transceivers which often operate in close proximity at the same time, the unwanted in-band radiation from the power amplifiers of one transmitter may interfere with nearby receivers operating in the same frequency band.

The present invention provides a cure for presently installed broadband equipment, and it is designed for connection to the existing equipment without the need for modifying any internal circuit. The present invention provides a dynamic filter system which is connected as a unit between the transmitter power amplifier and antenna for substantially reducing transmitted noise and spurs. The invention attacks the noise problem at its source, by dissipating the original carrier and regenerating a noise free carrier modulated with the original signal. The system has the capability of providing gain.

The primary noise problem with existing radios results because R.F. power is generated at fairly low power levels, usually in the low milliwatt region. Broadband amplifiers are then used to boost the power to high levels, e.g., 100W, and gains of 40–60 db between the R.F. oscillator level and the R.F. output level are not uncommon. Such high R.F. gain, since it acts on noise as well as signal, is directly responsible for the amplification and eventual radiation of broadband noise. This invention provides a unique means for materially reducing this noise without a power loss.

SUMMARY OF THE INVENTION

Broadly state, this invention provides a filter system which substantially reduces broadband noise which may include spurious signals in the output of a broadband transmitter by first dissipating the original R.F. power, generating R.F. oscillations at the original transmitted carrier frequency by means of a tunable high power (1 watt), low noise oscillator, modulating the oscillator output with the original desired signal with the original noise including the spurious signals filtered out, and then amplifying the low noise output of the power oscillator to the desired power level.

A key to the successful operation of this invention, i.e., the elimination of noise from the transmission, is the use of a high power, low noise oscillator. Since the R.F. power output of the oscillator is in the watt region, as compared with conventional oscillators operating in the milliwatt region, relatively little broadband R.F. gain is needed to boost the output power to its original level. The power oscillator disclosed in accordance with this invention is both digital and analog controlled, thereby permitting accurate high power, high Q tuning. The oscillator is uniquely designed so that the original noise is eliminated from the oscillator, and so that any broadband noise output is essentially thermal (−174dbm/Hz).

THE DRAWINGS

FIG. 3 is a block diagram showing a power oscillator made in accordance with this invention; and FIG. 4 is a block diagram of the digital AFC unit used in accordance with this invention.

DESCRIPTION OF THE ILLUSTRATED EMBODIMENT

Figure 1:
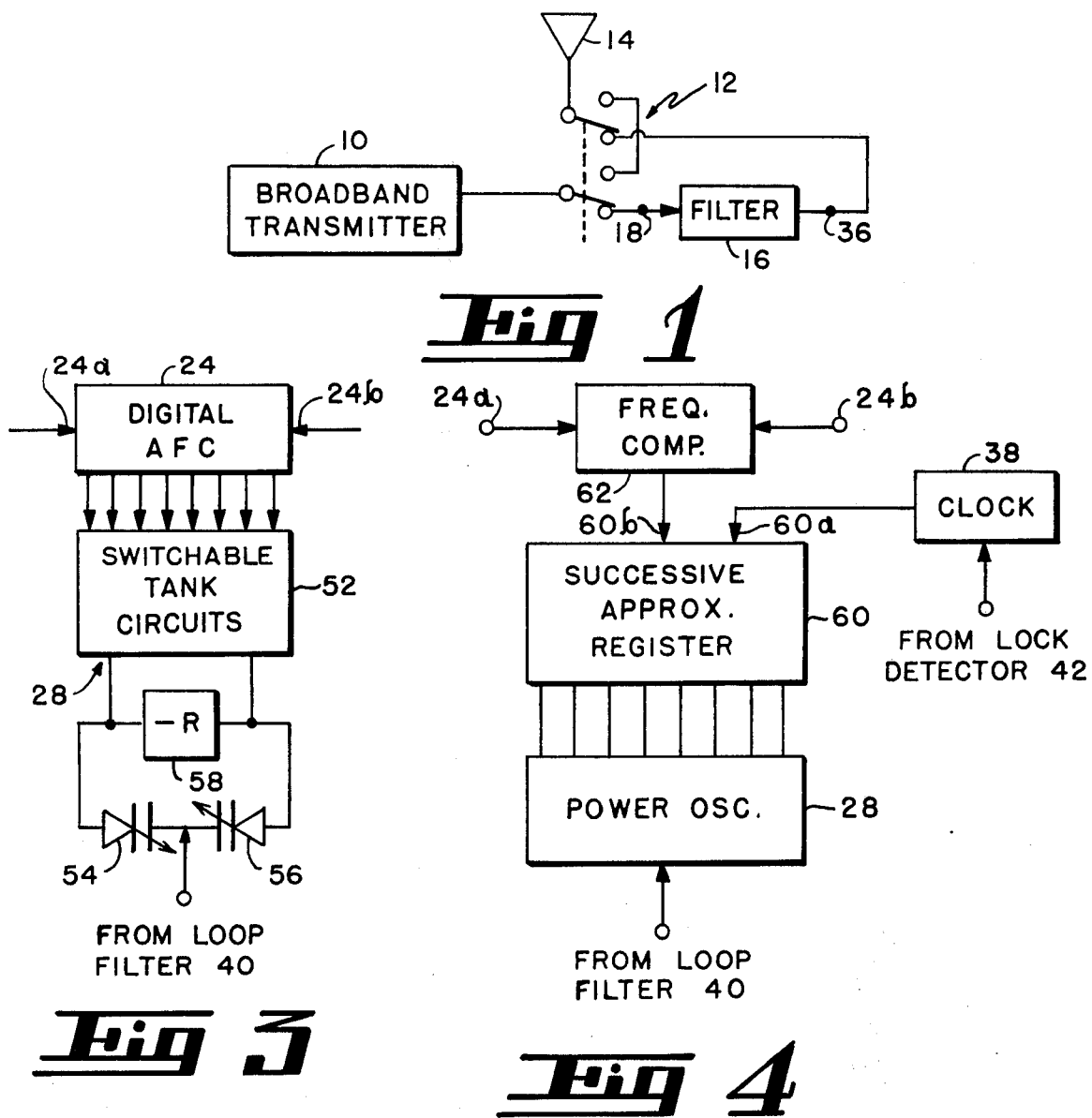
FIG. 1 is a block diagram showing the filter system in conjunction with a broadband transmitter.

As shown in FIG. 1, a modulated broadband transmitter 10 is connected by means of two two-position switches 12 directly to an antenna 14, or to the antenna 14 through a dynamic filter 16. Although not shown, the switch 12 may be operated automatically in response to the detection of power at the output of transmitter 10 or it may be operated manually. The filter 16, hereinafter to be described in detail, removes undesired broadband emissions including broadband noise and internally generated spurious signals from the transmitted signal, and effectively permits the radiation of only desired signals. The filter 16 provides a high degree of selectivity to off-channel signals and it is capable of handling high power levels with low distortion. It is automatically tunable at a very high speed, and it is highly accurate.

Figure 2:
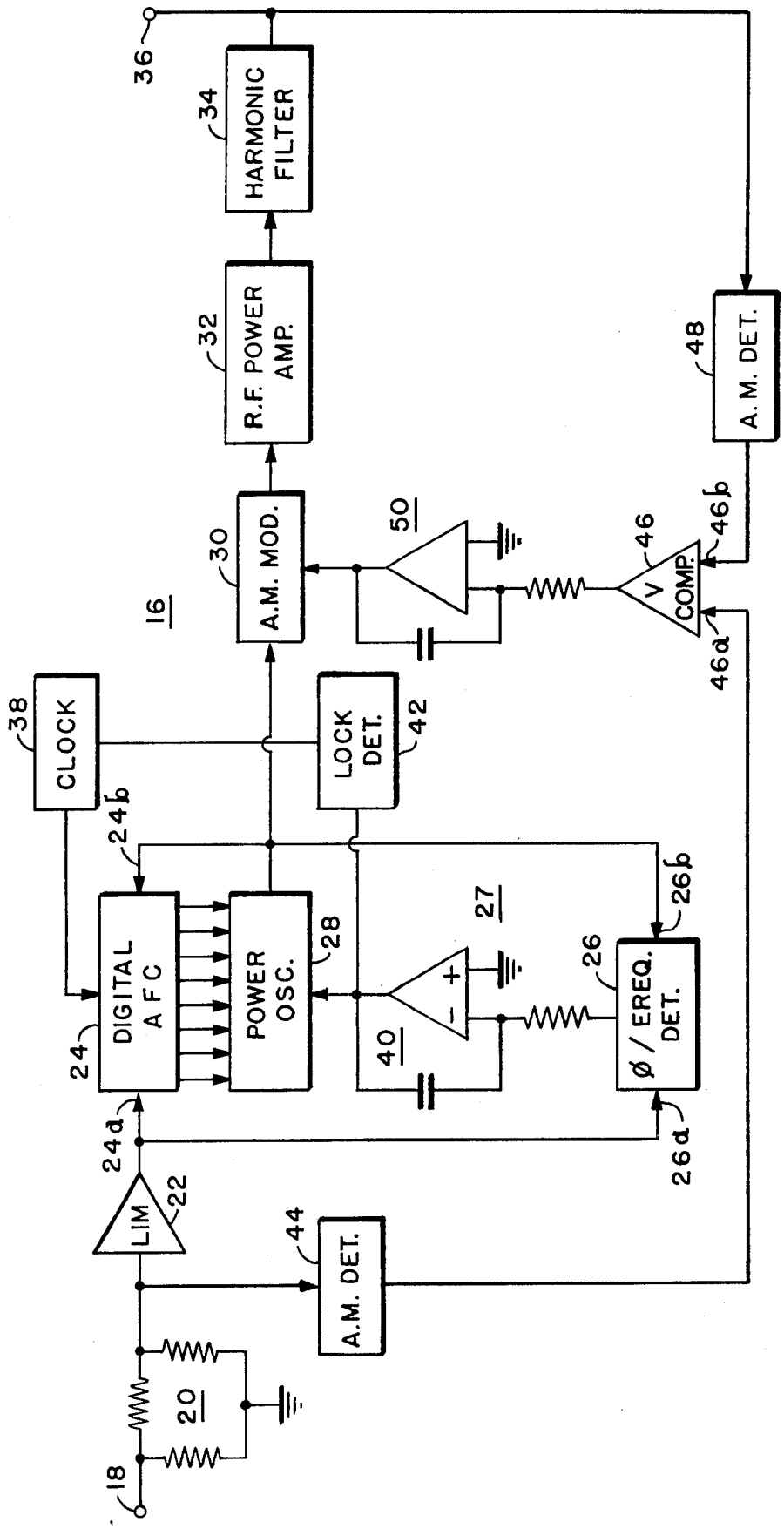
FIG. 2 is a block diagram showing a filter system made in accordance with this invention.

The filter 16 is shown in FIG. 2. The output of the R.F. power amplifier of the broadband transmitter 10 is applied to the filter input terminal 18 where most of the energy is dissipated in a resistive pad 20. The output of resistive pad 20 is then applied to a limiter 22 where the signal is hard limited to remove any A.M. components. The output of limiter 22 isapplied to one input terminal 24a of a digital AFC (automatic frequency control) circuit 24. In addition the output of limiter 22 is connected to one input terminal 26a of a phase/frequency detector 26 of a phase locked loop 27.

The heart of the filter is a power oscillator 28 which must be automatically tuned to the same carrier frequency as the original R.F. signal, and which must be provided with the same AM, FM or phase modulations. In addition the power oscillator 28 must be one which generates low noise levels. The limiter 22 supplies phase/frequency information to two separate feedback control loops for the oscillator 28. High speed coarse tuning is supplied by a digital automatic frequency control (AFC) loop 24 which digitally coarse tunes the power oscillator 28 to within a few percent of the incoming dissipated carrier. Exact tuning is accomplished by the phase locked loop (PLL) 27 which locks the oscillator to the exact frequency (zero error) of the incoming carrier. The phase locked loop 27 also follows any phase or frequency modulation (PM or FM) on the original signal within its loop bandwidth, superimposing the original modulation signals onto the power oscillator.

The output from the power oscillator 28 is applied to the second input terminal 24b of the Digital AFC circuit 24 where it is digitally compared to the original carrier and to the second input terminal 26b of the phase/frequency detector 26 where the comparison is analog. The regenerated carrier output of the power oscillator 28 is then applied to an A.M. modulator 30. After AM modulation, the oscillator output signal is amplified in power amplifier 32 and passed through a harmonic filter 34 prior to connection to antenna 14 via output terminal 36 and switches 12.

As above noted, the tuning of the power oscillator 28 is accomplished in two stages, coarse and fine. Coarse tuning is provided by the Digital AFC circuit 24 which compares the original carrier frequency at the output of the limiter 22 with the regenerated carrier frequency at the output of the power oscillator 28. As shown hereinafter AFC loop 24 consists of a successive approximation register which automatically shifts in response to the successively generated clock pulses from a clock 38. The digital AFC circuit 24 provides a digital word which selects a particular combination of L-C networks which serve to coarsely tune the oscillator 28.

The original carrier frequency output of the limiter 22 and the regenerated carrier frequency output of power oscillator 28 are compared in the phase/frequency detector 26 which yields a direct voltage error having a magnitude proportional to the difference in frequency and/or a phase between the applied signals. The error voltage output from detector 26 is applied through an integrator 40 (the loop filter) to the power oscillator 28 to fine tune it. Noise signals are not reproduced in the power oscillator since they fall outside the information passband of the integrator 40. When the output of the integrator 40 is fixed, the system is locked in phase and frequency. A lock detector 42 senses when the system is locked and stops the clock so that the shifting of AFC is stopped.

Since any amplitude modulation present in the original signal is removed by the limiter 20, the output of power oscillator 28 has no amplitude signal in it. To restore the AM signal the amplitude modulations are derived by means of a detector 44 connected at the output of pad 20. The output of detector 44 is then applied to the first input terminal 46a of a high gain voltage comparator 46. The comparator 46 is also supplied with the output of a detector 48 connected between output terminal 36 and the second input terminal 46b of the comparator 46.

The output of the voltage comparator 46 is a direct voltage representing the differences in amplitude between the signals applied at terminals 46a and 46b. The output of comparator 46 is applied to the AM modulator 30 through a loop filter 50. Thus, the AM loop operates by comparing the R.F. output signal with the R.F. input signal from the transmitter in a feedback control loop. The loop serves to amplitude modulate the output signal from the oscillator and thus reconstruct the original AM appearing on the input signal. A feedback loop is used rather than a feed-forward loop to eliminate any non-linearity in the high level modulator and R.F. amplifier circuitry. The feedback loop senses the modulation appearing at the R.F. amplifier output and compares it to the modulation on the incoming R.F. signal from the transmitter. By so placing any possible non-linearity inside of the loop, its effect is reduced by a factor equal to open loop gain. Thus the modulation appearing on the output signal is a replica of the incoming modulation, with very little distortion added by the remodulation process. The high gain comparator 46 forces the input and output modulations to track each other within the bandwidth of the loop filter or integrator 50.

If the signal at input terminal 18 to the filter 16 never contains amplitude modulations, the AM modulator 30 can be eliminated. However to make the filter universal, this is a desirable feature.

The basis of the disclosed filter is the technique for regeneration of a clean R.F. signal from an original high power carrier contaminated by noise and/or spurious content. The regenerated R.F. modulated carrier output from the power oscillator 28 is clean because it is generated at a relatively high power level without active buffering of the output signal. The result is an output signal ultimately containing no excess noise above the thermal noise level ($-174$ dBm/Hz).

Certain of the details of the power oscillator 28 are shown in FIG. 3. As in conventional oscillators the oscillator 28 comprises a resonant tank network across which a negative resistance 58 is connected. In the present case the tank network comprises a plurality of switchable resonant circuits 52 which are connected or disconnected in response to the input (a digital word) of the digital AFC circuit 24. In the system as shown there are eight binaries so that there are 256 combinations of tank network elements available to provide coarse tuning for the oscillator 28. The fine tuning elements for the oscillator 28 comprises two oppositely poled varicaps 54 and 56. Fine control of the capacitance of the varicaps 54 and 56 is provided by the output from the loop filter 27. All the phase and/or frequency modulation on the original carrier are passed through the loop filter 27 but the original noise is outside the filter bandpass and does not appear in the regenerated carrier. The negative resistance 58 for the oscillator is provided by a field effect transistor connected across the tank circuit. Maximum power, with minimum noise is achieved by taking the output from directly across the tank circuits 52.

Certain details of the Digital AFC circuit 24 are shown in FIG. 4. Basically the AFC circuit 24 is an analog to digital converter which utilizes a so-called successive approximation register 60. The register 60 has two input terminals, a clock input terminal 60a supplied with the output from clock 38 and a comparator input 60b supplied with the D.C. output of a comparator 62.

The output from the clock is a series of pulses each of which serves to advance the register one step. The output from the Frequency Comparator is a binary output representing whether the output of the power oscillator 28 is higher than or lower than the frequency of the desired transmission, i.e., the output of limiter 22.

As the register is stepped, the register 60 provides a binary output representing the decision as to whether the frequency error is positive or negative. Each step of the register halves the error so that ultimately, the error is reduced to a small, but coarse amount, within the range of the D.C. control voltage output from loop filter 40, so that the oscillator is then fine tuned to the exact carrier.

In summary, this invention provides unique means for substantially eliminating the broadband noise, including spurious outputs, from the carrier of a transmitter without the brute force use of high power filter elements. In essence, the invention contemplates the attenuation and limiting of the energy from the output of the transmitter, and the generating of a noise free carrier from a relatively high power oscillator slaved to the original carrier and modulations. The invention uses a unique, relatively high power (1 watt) oscillator which is digitally coarse tuned at high speed, and analog fine tuned, the loop filter in the analog circuitry passing the phase and/or frequency modulations, but rejecting substantially all broadband noise and spurious signals.

The invention is susceptible to many variations from the specific configurations and power levels as described. For example, while the invention was reduced to practice in conjunction with a 10 watt transmitter, the same principles are equally applicable to a 1000 watt or even higher power transmitter. It is therefore my intention that the invention be limited only by the following claims as interpreted in the light of the prior art.

I claim:

1. In a transmission system, the combination comprising:

an R.F. transmitter having a high power original carrier output with signal modulations and broadband noise thereon;

means for dissipating said high power original carrier output to a relatively low level;

a tunable power oscillator for regenerating said carrier, said oscillator having a low noise output;

comparison circuit means for comparing said lower level original carrier with said regenerated carrier and for automatically tuning said power oscillator to the frequency of said original carrier in response to a difference between said carriers, said comparison circuit means including means responsive to said low level original carrier to derive a voltage proportional to said signal modulations for modulating said oscillator; and means for amplifying the output of said power oscillator to a predetermined high power level.

2. The invention as defined in claim 1 wherein said oscillator is a relatively high power oscillator.

3. The invention as defined in claim 2 wherein said oscillator includes a plurality of fixed selectable resonant elements and at least one variable tuning element; and wherein said comparison circuit means comprises:

binary means for selecting a combination of said resonant elements to provide a resonant frequency approximating said original carrier; and analog means for varying said variable tuning element to tune said oscillator to the precise frequency of said original carrier.

4. The invention as defined in claim 3 wherein said analog means includes a filter for attenuating the broadband noise on said attenuated original carrier.

5. The invention as defined in claim 2 wherein said power oscillator comprises:

a resonant tank circuit having a plurality of selectable fixed resonant elements;

a variable tuning element connected across said resonant tank circuit;

a negative resistance element connected across said tank circuit, the output from said oscillator being taken from across said tank circuit.

6. The invention as defined in claim 5 and binary means for selecting a combination of said resonant elements to provide a resonant frequency approximating said original carrier; and analog means for varying said variable tuning element to tune said oscillator to the precise frequency of said original carrier.

7. The invention as defined in claim 6 wherein said analog means includes a filter for attenuating the broadband noise on said attenuated original carrier.

8. The invention as defined in claim 3 wherein said analog means comprises:

a phase/frequency detector having a varying direct current output responsive to the difference in phase and frequency of first and second signals applied to its first and second inputs, said attenuated original carrier being applied to one input, said regenerated carrier being applied to the other input;

a loop filter having a passband for the phase and/or frequency modulations on said low level original carrier, said direct current output being applied to variable tuning element, said broadband noise and spurious outputs on said attenuated original carrier being substantially outside of the passband of said loop filter.

9. The invention as defined in claim 8 wherein said binary means comprises:

a frequency comparator for generating a binary voltage in response to an error in frequency between the first and second signals applied thereto, said comparator having a first input terminal supplied with said attenuated original carrier, and a second input terminal supplied with said regenerated carrier output of said power oscillator;

a successive approximation register;

a clock for generating successive pulses to control said registers; and means responsive to the magnitude of said binary voltage for generating a binary voltage at each stage of said register, said binary voltages selecting certain ones of said resonant elements.

10. The invention as defined in claim 9, and means responsive to the variation of said direct current output from said loop filter for initiating said clock.

11. The invention as defined in claim 10, and means for amplitude modulating said regenerated carrier.

12. The invention as defined in claim 11 wherein said means for amplitude modulating said regenerated carrier comprises:

a first detector for detecting said low level original carrier;

a second detector for detecting the amplified output of said power oscillator;

a modulator supplied with the regenerated carrier output of said power oscillator;

a voltage comparator for generating an amplitude varying direct voltage responsive to the difference between the outputs of said first and second detectors;

a loop filter having a passband for passing said amplitude modulations, the noise on said low level original carrier being substantially outside of said passband;

the output of said voltage comparator being applied to said modulator through said loop filter.

13. The invention as defined in claim 6 wherein said analog means comprises:

a phase/frequency detector having a varying direct current output responsive to the difference in phase and frequency of first and second signals applied to its first and second inputs, said low level original carrier being applied to one input, said regenerated carrier being applied to the other input;

a loop filter having a passband for the phase and/or frequency modulations on said low level original carrier, said direct current output being applied to variable tuning element, said broadband noise on said low level original carrier being substantially outside of the passband of said loop filter.

14. The invention as defined in claim 13 and means responsive to the variation of said direct current output from said loop filter for initiating said clock.

15. The invention as defined in claim 14, and means for amplitude modulating said regenerated carrier.

16. The invention as defined in claim 15 wherein said means for amplitude modulating said regenerated carrier comprises:
- a first detector for detecting said low level original carrier;
- a second detector for detecting the amplified output of said power oscillator;
- a modulator supplied with the regenerated carrier output of said power oscillator;
- a voltage comparator for generating an amplitude varying direct voltage responsive to the difference between the outputs of said first and second detectors;
- a loop filter having a passband for passing said amplitude modulations, the noise on said low level original carrier being substantially outside of said passband;
- the output of said voltage comparator being applied to said modulator through said loop filter.

17. The invention as defined in claim 16 wherein said power oscillator comprises:
- a resonant tank circuit having a plurality of selectable fixed resonant elements,
- a variable tuning element connected across said resonant tank circuit;
- a negative resistance element connected across said tank circuit, the output from said oscillator being taken from across tank circuit.

18. The combination comprising:
- a high power transmitter having an original carrier modulated with signal and containing noise;
- a tunable oscillator for producing a regenerated carrier;
- means for attenuating the power of said modulated original carrier to produce an attenuated carrier;
- means for amplitude limiting said attenuated carrier;
- digital means for automatically coarse tuning said oscillator in response to a difference in frequency between said regenerated carrier and said attenuated carrier;
- analog means for fine tuning said oscillator in response to a difference in frequency between said attenuated carrier and said regenerated carrier, said analog means including means for frequency and/or phase modulating said regenerated carrier;
- means for amplitude detecting said attenuated carrier to derive the amplitude modulations thereof;
- means for modulating said regenerated carrier with said amplitude modulations; and
- means for power amplifying said modulated regenerated carrier.

19. The invention as defined in claim 18 wherein said means for amplitude modulating said regenerator comprises:
- a first detector for detecting said attenuated original carrier;
- a second detector for detecting the amplified output of said power oscillator;
- a modulator supplied with the regenerated carrier output of said power oscillator;
- a voltage comparator for generating an amplitude varying direct voltage responsive to the difference between the outputs of said first and second detectors;
- a loop filter having a passband for passing and amplitude modulations, the noise on said attenuated original carrier being substantially outside of said passband;
- the output of said voltage comparator being applied to said modulator through said loop filter.

20. The invention as defined in claim 18 wherein said analog means comprises:
- a phase/frequency detector having a varying direct current output responsive to the difference in phase and frequency of first and second signals applied to its first and second inputs, said attenuated original carrier being applied to one input, said regenerated carrier being applied to the other input;
- a loop filter having a passband for the phase and/or frequency modulations on said attenuated original carrier, said direct current output being applied to variable tuning element, said broadband noise on said attenuated original carrier being substantially outside of the passband of said loop filter.

21. The invention as defined in claim 18 wherein said binary means comprises:
- a frequency comparator for generating a binary voltage in response to an error in frequency between first and second signals applied thereto, said comparator having a first input terminal supplied with said attenuated original carrier, and a second input terminal supplied with said regenerated carrier output of said power oscillator;
- a successive approximation register;
- a clock for generating successive pulses to control said register; and
- means responsive to the magnitude of said binary voltage for generating a binary voltage at each stage of said register, said binary voltages selecting certain ones of said resonant elements.

* * * * *

UNITED STATES PATENT OFFICE
CERTIFICATE OF CORRECTION

PATENT NO. : 4,047,110
DATED : September 6, 1977
INVENTOR(S) : Eugene A. Janning It is certified that error appears in the above-identified patent and that said Letters Patent are hereby corrected as shown below:

In Claim 1, line 10:    Change "lower" to --- low ---.

In Claim 9, line 7:    Change "attenuated" to --- low level ---

In Claim 19, line 14:    Change "and" to --- said ---.

Signed and Sealed this

*Twenty-seventh* Day of *December 1977*

[SEAL]

Attest:

RUTH C. MASON
*Attesting Officer*

LUTRELLE F. PARKER
*Acting Commissioner of Patents and Trademark*